United States Patent [19]

Racine

[11] Patent Number: 4,578,768
[45] Date of Patent: Mar. 25, 1986

[54] COMPUTER AIDED COORDINATE DIGITIZING SYSTEM

[76] Inventor: Marsh V. Racine, 4069 Alameda Dr., San Diego, Calif. 92103

[21] Appl. No.: 597,132

[22] Filed: Apr. 6, 1984

[51] Int. Cl.⁴ .................. G01B 17/00; G06F 15/20
[52] U.S. Cl. ........................... 364/560; 178/18; 364/464
[58] Field of Search ............... 33/1 M, 1 CC; 178/18, 178/19; 364/518, 520, 559, 560, 561, 562, 563, 464

[56] References Cited

U.S. PATENT DOCUMENTS

| | | | |
|---|---|---|---|
| 3,134,099 | 5/1964 | Woo | 178/18 |
| 3,399,401 | 8/1968 | Ellis et al. | 178/18 X |
| 3,504,334 | 3/1970 | Turnage et al. | 178/18 X |
| 3,515,888 | 6/1970 | Lewis | 364/518 X |
| 3,652,842 | 3/1972 | Lewin | 364/564 |
| 3,653,031 | 3/1972 | Hlady et al. | 178/18 |
| 3,692,936 | 9/1972 | Moffitt | 178/18 |
| 3,731,273 | 5/1973 | Hunt | 178/18 X |
| 3,761,877 | 9/1973 | Fernald | 178/18 X |
| 3,808,364 | 4/1974 | Veith | 178/18 X |
| 3,821,469 | 6/1974 | Whetstone et al. | 178/18 |
| 3,857,022 | 12/1974 | Rebane et al. | 178/18 X |
| 4,012,588 | 3/1977 | Davis et al. | 178/18 |
| 4,018,989 | 4/1977 | Snyder et al. | 364/520 X |
| 4,124,838 | 11/1978 | Kiss | 364/561 |
| 4,213,005 | 6/1980 | Cameron | 178/18 |
| 4,246,439 | 1/1981 | Romein | 178/18 |
| 4,270,173 | 5/1981 | Suttler | 364/523 |
| 4,286,289 | 8/1981 | Ottesen et al. | 178/18 X |
| 4,301,447 | 11/1981 | Funk et al. | 178/18 X |
| 4,357,672 | 11/1982 | Howells et al. | 364/561 |
| 4,419,672 | 12/1983 | Hird | 178/18 X |
| 4,435,769 | 3/1984 | Nagano et al. | 364/464 |
| 4,435,772 | 3/1984 | Suzuki et al. | 364/520 |

Primary Examiner—Gary Chin
Assistant Examiner—Edward R. Cosimano
Attorney, Agent, or Firm—Brown, Martin & Haller

[57] ABSTRACT

The invention relates to a Computer Aided Coordinate Digitizing System for reading plans and calculating desired quantities from the readings. The system includes a digitizing device comprising a sensor assembly adapted to monitor an area in which a plan is placed and a signal generator adapted to generate a signal which is detected by the sensor assembly when it is placed at various positions on the plan. A computer is associated with the digitizing device for storing generated position data and program instructions for carrying out calculations using the data. A control device for operating the computer is adapted to be placed at a predetermined position in the area monitored by the sensor assembly so that the computer can be operated by placing the signal generator at appropriate positions on the control device.

8 Claims, 3 Drawing Figures

COMPUTER AIDED COORDINATE DIGITIZING SYSTEM

BACKGROUND OF THE INVENTION

1. Field of the Invention

The present invention relates to a Computer Aided Coordinate Digitizing System for reading plans, maps or other diagrams and for automatically calculating data such as material and cost estimates from the readings.

2. Description of the Prior Art

In the construction, planning, land survey, real estate, and many other industries, it is often necessary to calculate actual dimensions and parameters from blueprint plans, diagrams and/or quantity estimates from the calculations. It is tedious, time-consuming and often inaccurate to make such calculations by hand. To make building cost estimates, for example, it is necessary to take dimensions from the plan, scale these up to actual size, calculate such parameters as area, length or volume from the dimensions, and then convert these parameters into quantities of materials required and their cost. Inaccuracies in such estimates will involve over or under-ordering of materials and the consequent problems. If any subsequent changes are made to the plans, the entire process must be repeated.

Digitizing devices for taking location readings from plans have been developed, these devices generally comprising a sensor assembly and a signal generator in the form of a pointer which is placed at appropriate positions on a plan to generate a signal which is detected by the sensor assembly to pinpoint the position of the pointer.

After the required location readings have been taken, further calculations are normally required, such as calculations of dimensions area, volume, material quantities, and so on.

SUMMARY OF THE INVENTION

It is an object of the present invention to provide a digitizing system which is relatively easy and convenient to use.

It is a further object of the invention to provide a digitizing system in which calculations using digitizing location readings can be made speedily and accurately.

According to the present invention, a Computer Aided Coordinate Digitizing System for detecting co-ordinate positions on a flat surface on which a plan is placed and calculating desired parameters from the detected positions is provided. The system comprises:

a digitizing device for determining a series of X-Y co-ordinate positions on the surface, comprising pointer means for placing at selected positions on the flat surface and sensor means for detecting the positioning of said pointer means and generating an X-Y co-ordinate signal corresponding to said positioning;

a computer associated with said digitizing device and linking means for allowing said computer to receive said co-ordinate signals, said computer having memory means for storing program instructions and said co-ordinate signals, said program instructions including means for associating a series of pre-selected X-Y co-ordinate signals with a series of computer control and calculating functions;

control means for operating said system comprising a device adapted to be placed on said flat surface and having a plurality of control areas each corresponding to a respective one of said computer functions; and means for positioning said control device on said flat surface such that said control areas each coincide with the respective X-Y co-ordinate position associated with its computer function, such that said computer is operated by placing pointer means in a respective control area.

Thus the operator uses the same pointer both to obtain plotting data from a plan and to control the computer, to enter data, to initiate desired control operation and to cause the desired calculations available in the program instructions. This is clearly much more convenient than a manual or a two-stage process in which data must be entered using the pointer and/or a manual keypad of a computer, and where the keypad is used to make calculations using the entered data.

Preferably, the control device comprises a sheet on which a series of control functions are printed in control area boxes. When the control sheet is placed at the predetermined position relative to the sensor assembly and a plan to be digitized is also placed in the monitored field, the computer will be able to distinguish position data generated by placing the pointer at points on the plan from position data generated by placing the pointer at one of the control sheet boxes. Thus the computer recognizes data generated by placing the pointer at a control box and identifies it as the appropriate command control function.

The control sheet may be provided with computer operating functions as well as means for making numerical entries, means for making direct measurements from data entered from a plan, and means for effecting a series of programs to calculate and generate various desired information. Other operating functions such as mathematical calculations and unit conversions in both metric or Imperial Math may be provided. The computer is programmed such that each of the control position functions is identified correctly when the sheet is placed in the predetermined position relative to the sensor assembly. Thus a variety of different control functions may be provided, and different control sheets may be provided for different applications of the system, with suitable programming of the computer to identify the control sheet used.

In one embodiment of the invention the sensor assembly comprises a pair of linear microphones which are adapted to be placed coordinately to one another on a flat, elevated surface, and the pointer comprises a stylus adapted to emit a sound when touched to a surface in the area monitored by the microphones such that the X coordinate position of the sound is detected by one microphone and the Y coordinate position of the sound is detected by the other microphone. In this case each control area or box on the control sheet is identified with a regional X-Y coordinate position, such that touching the stylus to a particular control area will cause the computer to carry out the desired function.

To operate the system, the operator will adopt the microphones and stylus to a suitable flat or elevated surface, which may be a table, drawing board, wall, or blackboard, for example. The microphones preferably form an L-shaped frame. The control sheet is then positioned on the flat surface in a predetermined position in the field covered by the microphones. Since the computer is pre-programmed to associate X-Y coordinate data representing positions on the control sheet with the series of control functions provided on the sheet, the stylus can be placed at various points on a plan or map on the surface to produce X-Y coordinate data recognized as positions by the computer, and can be placed on various positions on the control sheet to effect control and the handling of the data by the computer.

In an alternative embodiment the sensor assembly may comprise an electromagnetic tablet which itself comprises the flat surface on which the plan, map or drawing is placed. The control sheet is appropriately positioned on the tablet. Such a tablet has a grid of sensors such that pressure applied at any point will be detected and a corresponding co-ordinate signal produced. Another sensor assembly which may be used in the system comprises an electromechanical articulated arm with a pointer at its free end. The arm includes detectors for sensing articulations of the arm, and can be calibrated with a suitable flat surface such that X-Y co-ordinate positions are detected by moving the pointer to selected places on the surface.

The computer is associated with a visual display device, keyboard entry device and a printer device for obtaining print-outs of information and calculations, such as material and cost estimates, for example.

With this digitizing system the operator only needs to use the computer keyboard for initial set-up of the system to accept data. During the actual take-off of data from a plan, the operator uses the stylus both to takeoff positions on the plan and to control how the data is handled by the computer, by placing the stylus at appropriate positions on the plan or the control sheet. Thus calculations can be made quickly and accurately.

BRIEF DESCRIPTION OF THE DRAWINGS

The following is a brief description of the accompanying drawings, which show a preferred embodiment of the invention.

DETAILED DESCRIPTION OF THE DRAWINGS

Figure 1:
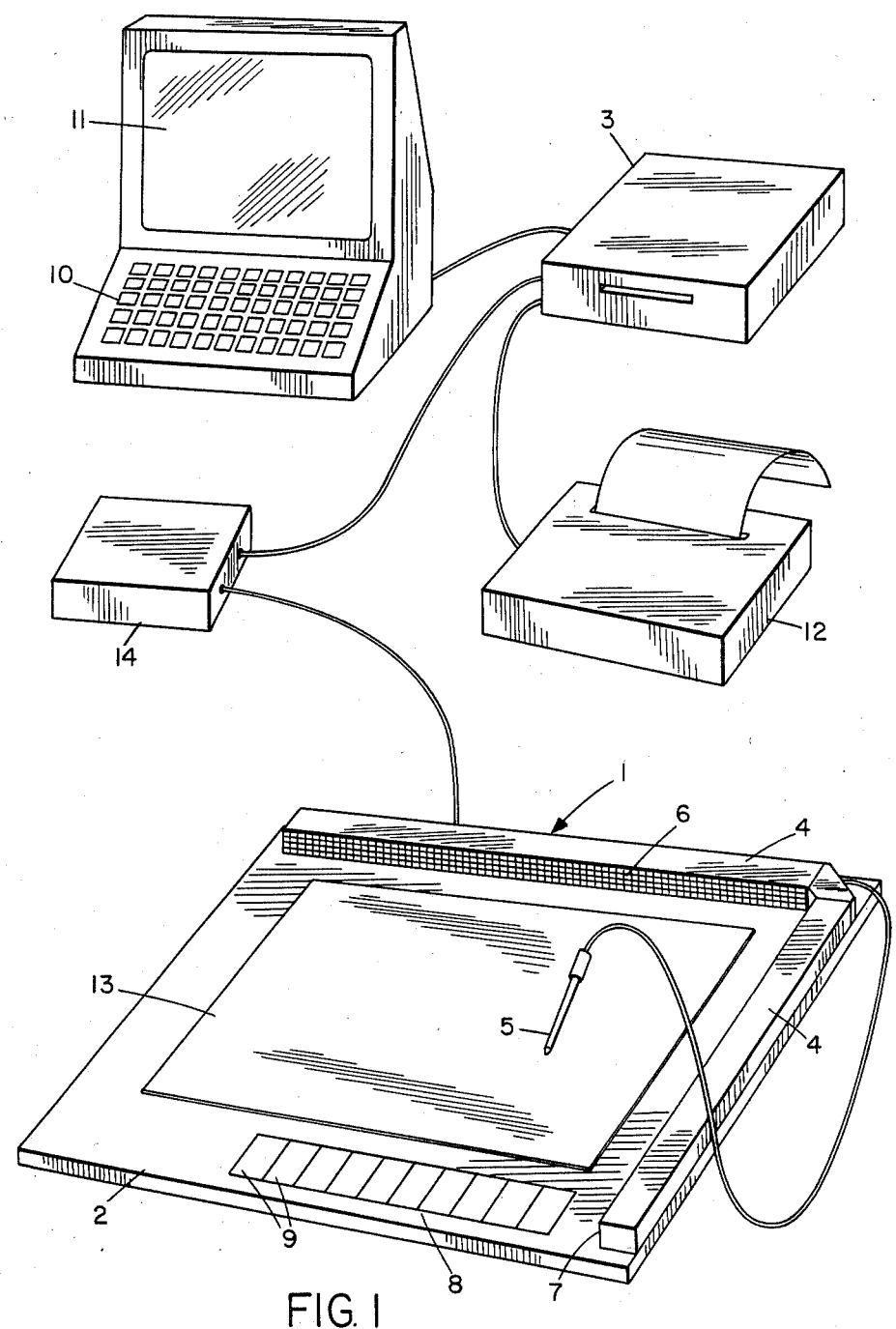
FIG. 1 is a schematic pictorial view of the digitizing system according to a preferred embodiment of the invention.

FIG. 1 is an overall pictorial representation of the Computer Aided Coordinate Digitizing System according to a preferred embodiment of the invention. The system basically comprises a digitizing device 1 which has been positioned on a flat surface 2, and a computer 3 associated with the digitizing device. The digitizing device 1 is adapted to measure X-Y positions on a map, plan or other drawing placed on the flat surface 2, as described in more detail below.

According to one embodiment, the digitizing device 1 comprises a sensor assembly 4 and a pointer or stylus 5 for giving out signals to be detected by the sensor assembly. In the preferred embodiment shown the sensor assembly 4 comprises a pair of sensitive, linear microphones 6 and 7 arranged in an L-frame shape on the flat surface 2, (left or right angle mounted,) to define X and Y coordinate directions on the surface. The surface 2 may be any suitable flat surface such as a table, drawing board, wall, or the like. The pointer 5 preferably comprises a pen-like writing stylus similar to the type described in U.S. Pat. No. 3,626,483, which produces a sound wave generated by a spark when it is touched to a surface. The microphones are preferably linear capacitor electric foil for construction microphones similar to the type described in U.S. Pat. No. 3,821,491.

A control device comprising a plastic control sheet or menu 8 is adapted to be precisely positioned on the flat surface 2 in the field monitored by the microphones 6, as described in more detail below. A series of computer functional control area boxes 9 are located on the control sheet 8.

The digitizing device may alternatively comprise an electromagnetic tablet having a grid of sensors on which the control sheet and a plan, map or other drawing can be placed. Positions on the plan or map and the control sheet are detected when pressure is applied to those positions. Another alternative digitizing device comprises an electro-mechanical articulated arm with a pointer of any type at its free end. The arm allows the pointer to be moved in the X-Y and Z directions. The articulated arm includes detectors for detecting such movements, and may be calibrated with any suitable flat surface on which the control sheet and a plan, map or drawing to be measured can be placed.

Figure 2:
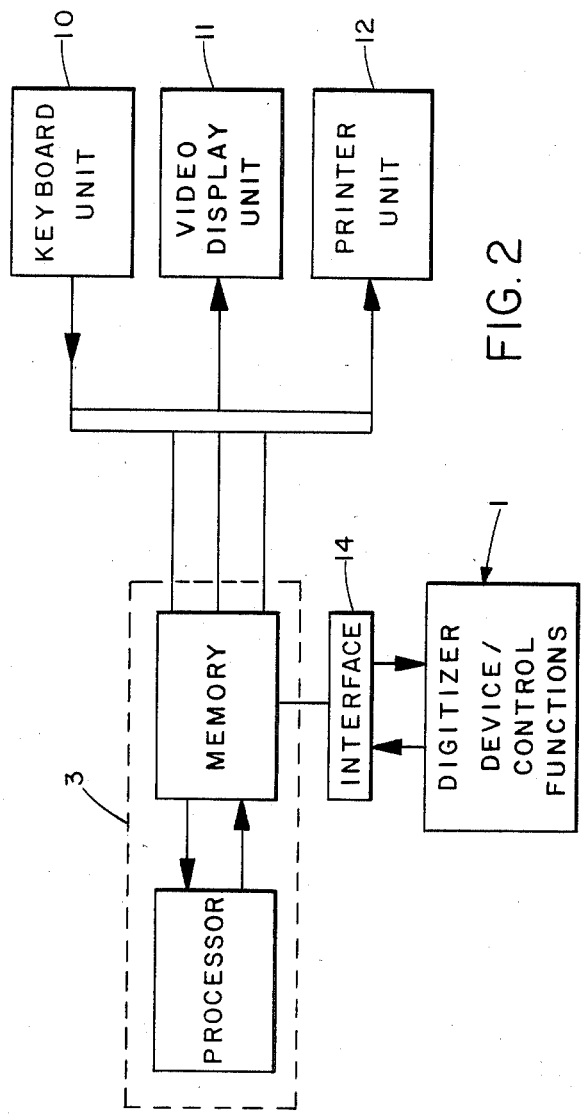
FIG. 2 is a block diagram of the major components of the system of FIG. 1.

The computer 3 is associated with a keyboard unit 10, a video display unit 11, and a printer unit 12, as seen in FIGS. 1 and 2. Any suitable computer and peripheral devices may be used. An interface device 14 interfaces the computer 3 to the digitizing device 1.

Suitable computers for use in this system include the KAYPRO II, IV, or X or compatible models, or the IBM PC, PCXT, PC Junior or other compatible models.

The interface device 14 between the computer 3 and the digitizing device 1 may be a serial interface comprising an RS-232 C device, or parallel using BCD or binary parallel.

To operate the system, the microphones 6 and 7 and control sheet 8 must first be set up on a suitable flat surface. The computer 3 is pre-programmed to regional X-Y coordinate data corresponding to control areas on the control sheet 9 as the appropriate control commands. The program listing for setting up these co-ordinates on a KAYPRO IV computer will be discussed below. The control sheet 9 is utilized so that its control areas correspond to the programmed X-Y coordinate positions, and it can be used as a control device for operating the computer by touching the stylus 5 to appropriate control areas on the sheet.

Figure 3:
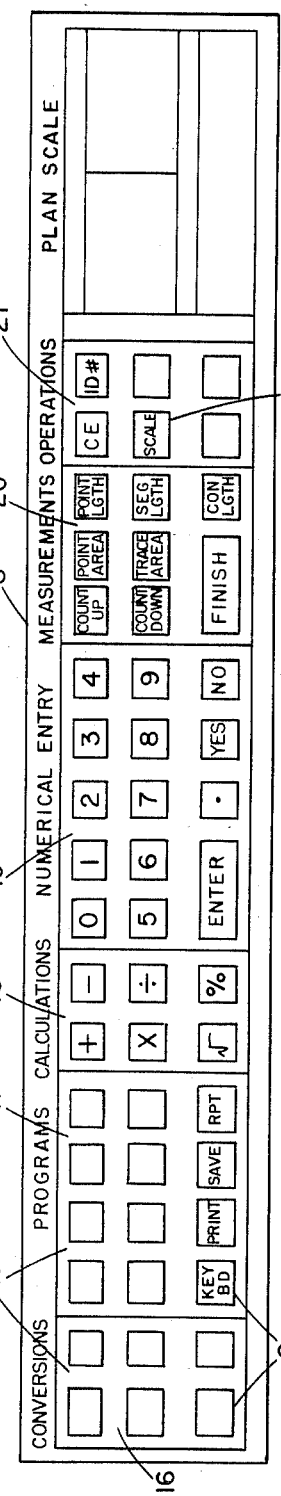
FIG. 3 is a plan view of the control sheet used in the system of FIG. 1.

Any desired control functions may be provided on the control sheet and associated with appropriate instructions in the computer's memory. Various different control sheets may be provided for different applications of the system. FIG. 3 represents one suitable control sheet on which a series of control areas are provided within boxes 9 printed on the sheet 8. Each box has a command, entry or control function printed on it, and each of these functions will be associated in the computer with a corresponding X-Y position relative to the microphones 6 and 7. The sheet 8 must be accurately positioned so that the boxes 9 lie in the correct X-Y coordinate positions.

The computer is therefore preferably programmed to assist in positioning the sheet 8. The sheet is first roughly positioned on the surface 2. The stylus 5 is then placed at selected positions (e.g. line intersections) on the sheet 8 until the computer approves a final placement. At this point the center of each function symbol should correspond with a specific command operation in the computer memory. This number will appear on the video display unit when the stylus is placed at the center of the symbol if the sheet 8 is correctly positioned. Thus the sheet positioning can be finely adjusted until the number appears.

Once the control sheet has been correctly positioned, it is fixed to the surface 2, for example, by taping, gluing or screwing it down. In a preferred embodiment the control sheet 8 is made in two parts, a base part and a menu holder part. In this way the menu holder part can be removed to change menus in order to allow a different series of control functions to be performed, while maintaining the correct positioning.

When the system has been set up with the control sheet 8 correctly positioned, a plan or other drawing 13 is placed on the surface 2 in the field of the microphones 6 and 7. The system is then set up to perform any one of a series of measurements, calculations and other programmed functions at the option of the operator by simply placing the stylus 5 at appropriate positions on the sheet 8 and plan 13. When the stylus 5 is placed at a point on the sheet 8 or plan 13, it emits a sound which is detected by the microphones to enable them to precisely pinpoint the position touched. A signal representing the X-Y coordinates of that position is then entered in the computer's memory. The computer is programmed to distinguish plan positions from control sheet positions and to operate accordingly.

The control sheet 8 shown in FIG. 3 is provided with various types of control functions collected together in groups. In each group, various functions are printed in a series of boxes 15 defining control area positions when the sheet 8 is correctly positioned. The first group of functions 16 is for making conversions from one set of units to another and vice versa, including, in the preferred embodiment, feet to yards, square feet to acres, square feet to square yards, inches to feet, cubic feet to cubic yards, pounds to tons, and/or metric measurements.

The second group 17 is a listing of various programs available in the computer for handling data, such as "Weight", which is a program for calculating weight of material. Also included in the preferred embodiment are pitch, area, MBF, topography, angles, volume, units required. Also included are computer control function boxes.

A third group 18 lists various mathematical functions which can be carried out directly by the operator. A fourth group 19 provides numerical entry boxes for entering data not available on the plan, such as scale, depths or thicknesses, weight per unit, and so on. The fifth group 20 provides function boxes for carrying out direct measurements from a plan, such as length and area. A sixth group 21 provides operations functions such as CE (Clear), RESTART, and PAGE (to record a plan page number). The operations function COMP. PROG. activates a compensation program, which allows the operator to compensate for stretching or shrinking of paper, or Not to Scale (NTS) drawings. The operator enters the longest vertical and longest horizontal dimensions from the plans. The program will then automatically compensate for any future measurements made on that page. The SCALE function is used to enter plan scales, according to a key 22 printed on the control sheet.

The method of making direct measurements using the system with the control sheet shown in FIG. 3 will now be described. If an operator wishes to find the area of a four cornered design on a plan, for example, the plan scale is first entered by touching the stylus 5 to the SCALE box and the appropriate numerical boxes. The measurement box "POINT AREA" is then touched. The stylus is then touched to each corner of the design. The area enclosed is then computed automatically and the result given on the video display. To calculate the area or perimeter of a curved or other odd-shaped design, the stylus is first touched to "TRACE AREA" or "CON. LENGTH" (continuous length), and then used to trace the outline of the design. "POINT LENGTH" is used to determine straight lengths or the perimeter length of a straight cornered structure, and "SEG. LENGTH" is used to determine the lengths of a series of segments or lines on a plan, for example lines representing beams, headers, pipes, and so on. The lengths will be listed individually, and a total will be computed. "COUNT UP" and "COUNT DOWN" are used for counting individual items on a plan, such as electrical outlets. The FINISH key is used at the end of any measurement made. SAVE is used to store measurements in the computer's memory.

A series of programs are provided for carrying out computations from measurements made on a plan or map. These programs can be designed for various applications of the system, such as building, construction, real estate, planning and land use, highway departments, transportation, military and medical applications. The programs provided on the menu shown in FIG. 3 are biassed towards building or construction applications, but suitable programs could clearly be provided for the quantity and cost estimates necessary in other fields.

The function of the programs shown on the sheet in FIG. 3 will now be described briefly. "WEIGHT" is used when a calculation of a total weight of material is desired. An appropriate measurement is first made using one of the measurement functions, and the weight per unit is entered using the numbered boxes. A total weight will then be calculated by the computer.

"PITCH" is used to compute roofing areas based on the slope of the roof and the number of squares of roofing required. The total roof area is first calculated using "POINT AREA". The roof pitch is then entered. The numbers of squares of roofing required is then reported.

"AREA" is used when a dimension not on the plan is needed. For example, if the length of all walls has been calculated using "POINT LENGTH", their area can be calculated by using the "AREA" program and entering the height of the walls.

"MBF" is used to convert lengths of lumber to mill board measure, when the lengths have been measured using "SEG. LENGTH", "POINT LENGTH" or "CON LENGTH."

"TOPO" is used in land engineering to trace topographical areas, and to compute earth movement.

"ANGLE" is used to determine any angle of a triangle, the length of the sides of a triangle, or any area within a triangle.

"VOL" is used to determine a volume after an area has been measured. For example, if the volume of concrete in a slab floor is to be measured, the area is first determined using "POINT AREA". The thickness or depth of the floor is then entered. The resultant answer gives the volume of concrete contained in the floor.

"UNITS REQ'D" determines the total number of individual units required at a programmed spacing, e.g.

the number of joists required at a selected spacing for a previously measured length of floor, for example.

"KEYB'D" allows access to the computer keyboard unit 10 in order to enter written notations or to change descriptions of an item to be listed on a print-out.

"PRINT" is the control commanding the printer unit 12 to print out designated information and calculations.

Clearly other programs or alternative programs may be provided for specific purposes.

A listing of the code for the computer program which operates a KAYPRO IV computer to perform the function described above is disclosed herewith and is hereby entered in the file wrapper which will become generally available upon issuance of this patent, and such disclosure is hereby incorporated herein by specific reference. It is entitled Computer Aided Coordinate Digitizing System: DDT VERS 2.2.

The digitizing system according to this invention is quick, convenient and accurate to use. The provision of a control device which can be operated by the digitizing device stylus results in easy and convenient operation of the system, since the operator does not have to lay down the stylus repeatedly in order to enter instructions at the computer keyboard.

The digitizing device and control device can be interfaced to most computers using a compatible operating system.

This system is not necessarily designed exclusively for use in construction Takeoffs and estimates as herein described. By modifying the control areas provided within boxes 9 printed on control sheet 8 utilizing programs indigenous to the user's requirements, the system becomes a data input method applicable to Private Aviation, Medical Applications, education, transportation, Marine technology, architecture, engineering, military, and others.

It will be clear that modifications can be made to the disclosed embodiment without departing from the scope of the invention. The invention is therefore not limited to the disclosed embodiment but is defined by the appended claims.

What is claimed is:

1. A computer aided co-ordinate digitizing system for use as a construction estimating system for detecting coordinate positions on a flat surface on which a series of construction drawings are placed sequentially and for calculating desired parameters relative to the positions and generating an estimate of the cost of construction of a structure represented on said construction drawings, the system comprising:

a digitizing device for determining a series of X-Y co-ordinate positions on a flat surface, comprising pointer means for placing at selected positions on the flat surface and sensor means for detecting the position of said pointer means and generating a series of X-Y co-ordinate data positions relative to said construction drawings corresponding to the positioning of said pointer means at a series of selected positions on said drawings;

a computer associated with said digitizing device and linking means for allowing said computer to receive said coordinate signals, said computer having memory means for storing program instructions and said co-ordinate signals, said program instructions including means for associating a series of preselected X-Y co-ordinate signals with a series of computer control and calculating functions and means for using said X-Y co-ordinate data positions in response to respective control and calculating functions for calculating a series of desired parameters as is required to generate an estimate of the cost of construction of a structure represented on said construction drawings;

control means for operating said system comprising a control device located on said flat surface and having a plurality of control areas each corresponding to a respective one of said computer functions; and means for positioning said control device on said flat surface such that each of said control areas coincides with a subset of the respective X-Y co-ordinate positions associated with said respective series of computer control and calculating functions;

said computer being operated by placing said pointer means in a respective control area and said sensor means detecting the position of said pointer means, whereby said control means associates the X-Y co-ordinate position with the respective control area and causes the computer to operate the program instructions associated with said control area to produce the desired parameter.

2. The system of claim 1, wherein said sensor assembly comprises a pair of linear microphones adapted to be placed coordinately on a flat surface to define X and Y coordinate axes, and said pointer comprises a stylus adapted to emit a sound when touched to a surface in said monitored area, one of said microphones comprising means for detecting the X coordinate position of said sound and the other of said microphones comprising means for detecting the Y coordinate position of said sound, said control means being positioned such that each control area corresponds to a respective X-Y coordinate position, and said computer operating said program instructions to associate X-Y coordinate positions corresponding to said control areas with the appropriate command function.

3. The system of claim 1, wherein said computer is associated with a printer unit, and said control means includes means for controlling operation of said printer unit.

4. The system of claim 1, wherein said control means includes numerical entry means, computer operating means, means for activating program instructions stored in said computer, and means for carrying out mathematical calculations.

5. The system of claim 1, wherein said control device comprises a control sheet having a series of control functions printed on it in boxes comprising said control areas.

6. The system of claim 5, wherein a plurality of different control sheets each having a different series of control functions printed on it are provided, and said computer is programmed to identify the control sheet used.

7. The system of claim 5 wherein said series of control functions include a data conversion group; a data handling group; a mathematical function group; and a computer operations group; each of said groups being defined by respective control areas on said control sheet and for association with a respective series of said program instructions whereby to provide respective responses to the selected control functions.

8. A method of generating an estimate of the cost of construction of a building represented by a plan comprising a series of construction drawings, comprising the steps of:

associating a series of pre-selected areas of a flat surface with a series of control functions for operating a computer;

placing a control device having a series of control areas each corresponding to a respective one of the control functions on the flat surface such that each control area coincides with the pre-selected area of the flat surface associated with that control function;

placing a series of construction drawings representing a building plan sequentially on the flat surface;

positioning a pointer device at a series of selected positions on each drawing and at selected positions on said control device;

monitoring the pointer device with a sensing device linked to a computer;

controlling the sensor device to generate a series of X-Y co-ordinate signals corresponding to the positioning of the pointer device on the drawing and to generate control signals in response to the positioning of the pointer device on selected control areas of the control device;

providing the generated series of X-Y co-ordinate signals as data input to the computer; and controlling the computer in response to program instructions stored in the memory of the computer and control signals received from the control device to utilize the data input from the sensor device to calculate a series of desired parameters and to generate from the calculated parameters an estimate of the cost of construction of a building represented by the construction drawings.

* * * * *

REEXAMINATION CERTIFICATE (1134th)
United States Patent [19]
Racine

[11] B1 4,578,768
[45] Certificate Issued Sep. 26, 1989

[54] COMPUTER AIDED COORDINATE DIGITIZING SYSTEM

[76] Inventor: Marsh V. Racine, 4069 Alameda Dr., San Diego, Calif. 92103

Reexamination Request:
No. 90/001,083, Sep. 5, 1986

Reexamination Certificate for:
Patent No.: 4,578,768
Issued: Mar. 25, 1986
Appl. No.: 597,132
Filed: Apr. 6, 1984

[51] Int. Cl.$^4$ .................. G01B 17/00; G06F 15/20
[52] U.S. Cl. .................. 364/560; 364/464.01; 178/18
[58] Field of Search ........ 364/464, 518, 521, 560–562, 364/192, 200, 900; 178/18–20; 33/1 M, 1 CC; 340/709; 377/24, 47, 52, 55

[56] References Cited
U.S. PATENT DOCUMENTS

| | | | |
|---|---|---|---|
| 3,342,979 | 10/1967 | Wright et al. | 377/24 |
| 3,412,238 | 11/1968 | Lineback | 377/24 |
| 3,601,585 | 8/1971 | Paulsen | 377/24 |
| 3,602,902 | 8/1971 | Madden | 377/55 X |
| 3,892,958 | 7/1975 | Tung | 364/709 |
| 4,145,742 | 3/1979 | Olander, Jr. et al. | 364/709 |
| 4,150,427 | 4/1979 | Slawson | 364/192 X |
| 4,232,311 | 11/1980 | Agenta | 340/707 X |
| 4,266,279 | 5/1981 | Hines | 364/726 X |
| 4,279,015 | 7/1981 | Edelman et al. | 364/200 |
| 4,280,121 | 7/1981 | Crask | 364/709 X |
| 4,314,330 | 2/1982 | Slawson | 364/192 |
| 4,446,520 | 5/1984 | Shigeta et al. | 364/192 |
| 4,467,410 | 8/1984 | Kim | 364/200 |
| 4,484,272 | 10/1984 | Green | 364/200 |
| 4,506,336 | 3/1985 | Hird | 364/518 |
| 4,524,421 | 6/1985 | Searby et al. | 364/521 |
| 4,546,434 | 9/1985 | Gioello | 364/192 X |
| 4,567,567 | 1/1986 | Lapeyre | 364/709 |
| 4,586,035 | 4/1986 | Baker et al. | 178/18 X |
| 4,595,990 | 6/1986 | Garwin et al. | 364/709 |

OTHER PUBLICATIONS

*Webster's New World Dictionary*, Second College Edition, The World Publishing Co., 1972, p. 1182.
Graf, Rudolf F., *Radio Shack TM Dictionary of Electronics*, Tandy Corp. Co., Fourth Edition, 1975, pp. 478–479.
Mellichamp, D., *Real-Time Computing with Applications to Data Acquisition and Control*, 1983, pp. 3–11 and 33–51.
Gunn et al., "Acoustical Data Input Panel", *IBM Technical Disclosure Bulletin*, vol. 12, No. 3, Aug. 1969, p. 390.
Software Product Description, Precision Design Builders, Inc., 1981.
System Menu, Precision Design Builders, Inc. (PDB), 1981.
"Digitizer Routines", PDB, Inc., Jun. 22, 1981.
Construction Computer Application Newsletter, Apr. 1983, p. 5.
Brochure entitled, "Let's Get Right to the Point", Copyright CCC Corporation, 1982.

*Primary Examiner*—P. S. Lall
*Assistant Examiner*—Joseph L. Dixon

[57] ABSTRACT

The invention relates to a Computer Aided Coordinate Digitizing System for reading plans and calculating desired quantities from the readings. The system includes a digitizing device comprising a sensor assembly adapted to monitor an area in which a plan is placed and a signal generator adapted to generate a signal which is detected by the sensor assembly when it is placed at various positions on the plan. A computer is associated with the digitizing device for storing generated position data and program instructions for carrying out calculations using the data. A control device for operating the computer is adapted to be placed at a predetermined position in the area monitored by the sensor assembly so that the computer can be operated by placing the signal generator at appropriate positions on the control device.

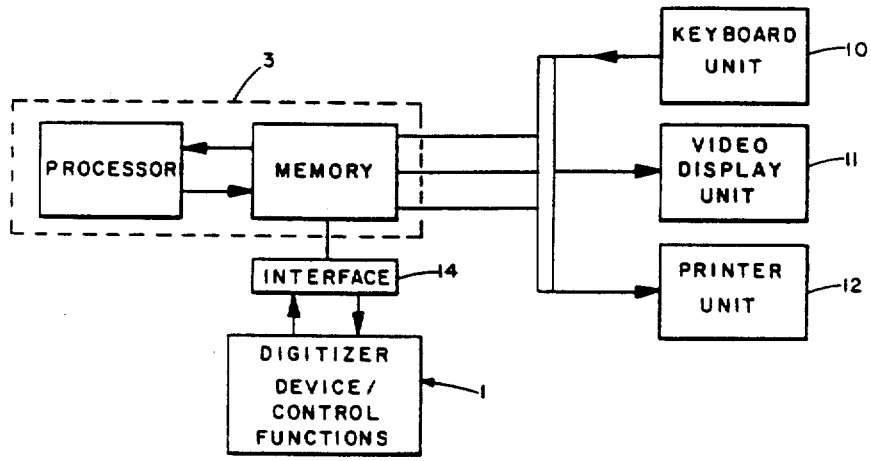

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–8 are cancelled.

* * * * *